(12) United States Patent
Luthra et al.

(10) Patent No.: US 12,294,497 B2
(45) Date of Patent: May 6, 2025

(54) SYSTEM AND METHOD FOR UNIFICATION OF POLICY ONBOARDING

(71) Applicant: Rakuten Mobile, Inc., Tokyo (JP)

(72) Inventors: Mohit Luthra, Singapore (SG); Vijay Kumar, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/000,129

(22) PCT Filed: Sep. 22, 2022

(86) PCT No.: PCT/US2022/044371
§ 371 (c)(1),
(2) Date: Nov. 29, 2022

(87) PCT Pub. No.: WO2024/063779
PCT Pub. Date: Mar. 28, 2024

(65) Prior Publication Data
US 2025/0097112 A1  Mar. 20, 2025

(51) Int. Cl.
*G06F 15/177* (2006.01)
*H04L 41/0894* (2022.01)

(52) U.S. Cl.
CPC .............................. *H04L 41/0894* (2022.05)

(58) Field of Classification Search
CPC .................................................... H04L 41/0894
See application file for complete search history.

(56) References Cited

U.S. PATENT DOCUMENTS 11,075,891 B1    7/2021  Long et al.
2017/0141973 A1  5/2017  Vrzic

*Primary Examiner* — Joseph R Maniwang
(74) *Attorney, Agent, or Firm* — HAUPTMAN HAM, LLP

(57) ABSTRACT

A method for policy onboarding includes receiving, by a processor, a request from a network slice service builder module for registration of an application bundle; requesting, by the processor, a central inventory create an application bundle object; requesting, by the processor, a policy manager create a policy descriptor file corresponding to one or more rule-based policy and the application bundle; and receiving, by the processor, a policy identifier (ID) for the application bundle from the policy manager.

20 Claims, 19 Drawing Sheets

Orchestrator
Templates > Slice

Displaying 10 of 26 Slice Templates

Create New Slice

| Status | Name | Slice Service Type | ServiceCategory | Domain | Vendor | Version | Shared | Created Date | Last M... |
|---|---|---|---|---|---|---|---|---|---|
| ☐ Active | Slice Template for Mobile | eMBB | Home Automation | RAN | ABC | 1.0.0 | Yes | xx/xx/xxxx | xx/xx/xxxx |
| ☐ Inactive | Slice Template for TV | Custom | High Speed Train | TRANSPORT | GHI, ABC | 1.0.1 | No | xx/xx/xxxx | xx/xx/xxxx |
| ☐ Active | Slice Template for game | uRLLC | Home Automation | CORE | DEF | 1.0.0 | Yes | xx/xx/xxxx | xx/xx/xxxx |
| ☐ Active | Slice Template for IoT | mIoT | High Speed Train | E2E | GHI, DEF | 2.0.0 | No | xx/xx/xxxx | xx/xx/xxxx |
| ☐ Active | Slice Template for Mobile | eMBB | Home Automation | RAN | DEF, ABC | 1.5.0 | Yes | xx/xx/xxxx | xx/xx/xxxx |
| ☐ Inactive | Slice Template for TV | Custom | High Speed Train | TRANSPORT | ABC | 3.0.0 | No | xx/xx/xxxx | xx/xx/xxxx |
| ☐ Active | Slice Template for game | uRLLC | Home Automation | CORE | GHI | 4.0.0 | Yes | xx/xx/xxxx | xx/xx/xxxx |
| ☐ Active | Slice Template for IoT | mIoT | High Speed Train | E2E | GHI, ABC | 1.0.0 | No | xx/xx/xxxx | xx/xx/xxxx |
| ☐ Inactive | Slice Template for Mobile | eMBB | Home Automation | RAN | DEF | 1.0.1 | Yes | xx/xx/xxxx | xx/xx/xxxx |
| ☐ Active | Slice Template for TV | Custom | High Speed Train | TRANSPORT | GHI, DEF | 1.0.0 | No | xx/xx/xxxx | xx/xx/xxxx |
| ☐ Inactive | Slice Template for game | uRLLC | Home Automation | CORE | DEF, ABC | 2.0.0 | Yes | xx/xx/xxxx | xx/xx/xxxx |
| ☐ Active | Slice Template for IoT | mIoT | High Speed Train | E2E | GHI | 1.5.0 | No | xx/xx/xxxx | xx/xx/xxxx |
| ☐ Inactive | Slice Template for Mobile | eMBB | Home Automation | RAN | ABC | 3.0.0 | Yes | xx/xx/xxxx | xx/xx/xxxx |
| ☐ Active | Slice Template for TV | Custom | High Speed Train | TRANSPORT | GHI, ABC | 4.0.0 | No | xx/xx/xxxx | xx/xx/xxxx |
| ☐ Inactive | Slice Template for game | uRLLC | Home Automation | CORE | DEF | 1.0.0 | Yes | xx/xx/xxxx | xx/xx/xxxx |
| ☐ Active | Slice Template for IoT | mIoT | High Speed Train | E2E | GHI, DEF | 1.0.1 | No | xx/xx/xxxx | xx/xx/xxxx |
| ☐ Active | Slice Template for Mobile | eMBB | Home Automation | RAN | DEF, ABC | 1.0.0 | Yes | xx/xx/xxxx | xx/xx/xxxx |

FIG. 4

Orchestrator
Slice Manager > ... > Create New Slice Design  🔍 Search  All ▾

◉ Basic Information — ○ Slice Definition — ○ Slice Subnet Profile — ○ OSLAs — ○ Preview

Enter Service Information

Name*
[Slice Test 1] — 502

Select Slice Type

| eMBB Slice | mIoT Slice for Smart City | mIoT Slice for Monitoring | uRLLC Slice for Health Care | V2X Slice for Connected Cars |

— 504

Service Category*
[Home Automation ▾]

Slice Template*
[Slice Template 1  🔍] — 508

Slice Differentiator*
[0]

Select Domain — 506
☑ RAN  ☑ Core  ☑ Transport

Resource Sharing Level - RAN*
[Shared ▾] — 508A

Resource Sharing Level - Core*
[Dedicated ▾] — 508B

Resource Sharing Level - Transport*
[Dedicated ▾] — 508C

PLMN ID*
[44011] — 512

Select Coverage Area

Coverage Area*
[TA1 x  TA2 x  TA3 x  TA4 x  +3  🔍] — 510

[Cancel]  [Next]

FIG. 5

Configure Service Profile

| | |
|---|---|
| Max Number of UEs | − 12,000 + |
| Latency | − 300 + |
| UE Mobility Level | Fully ▾ |
| Resource Sharing Level | Shared ▾ |
| Downlink Throughput Per Slice (Mbps) | − 700 + |
| Downlink Throughput Per UE (Mbps) | − 400 + |
| Uplink Throughput Per Slice (Mbps) | − 5,000 + |
| Uplink Throughput Per UE (Mbps) | − 1 + |
| Availability (%) | − 99.50 + |
| Exp Date Rate DL (Mbps) | − 450 + |
| Exp Date Rate UL (Mbps) | − 350 + |
| Max Number of Connections | − 10,000 + |

Calculate

Slice Profile

| Parameters | RAN | Core | Transport |
|---|---|---|---|
| Status | Not Shared | Not Shared | Not Shared |
| Latency | 1 ms | 1 ms | 1 ms |
| Max Number of UEs | 10,000 | 10,000 | 10,000 |
| Coverage Area TA List | Kiba | Kiba | Kiba |
| UE Mobility Level | Fully | Fully | Fully |
| Resource Sharing Level | Shared | Dedicated | Dedicated |
| Exp Date Rate UL | 75 Mbps | 75 Mbps | 75 Mbps |
| Exp Date Rate DL | 350 Mbps | 350 Mbps | 350 Mbps |
| Area Traffic Cap UL | 300 Mbps | 300 Mbps | 300 Mbps |
| Area Traffic Cap DL | 400 Mbps | 400 Mbps | 400 Mbps |
| E2E Latency | 2 ms | 2 ms | 2 ms |
| Availability | 99.50% | 99.50% | 99.50% |
| Exp Date Rate | 300 Mbps | 300 Mbps | 300 Mbps |

FIG. 6

Orchestrator

LCM > ... > Create New Slice Design

◉ Basic Information — ⊙ Slice Definition — ◉ Slice Subnet Profile — ○ SLAs — ○ Preview

Select Subnet and Check Feasibility

RAN

| Network Slice Subnet Name* | Network Service | Feasibility Status |
|---|---|---|
| eMBB RAN NSSI 1, High ▽ | UHN1TKY100401123 +3 | - |

Core

| Network Slice Subnet Template* | Network Service | Feasibility Status |
|---|---|---|
| eMBB Core Dedicated Template 1 ▽ | UHN1TKY100401245 +5 ✎ | - |

Transport

| Network Slice Subnet Template* | Transport Path | Feasibility Status |
|---|---|---|
| eMBB TN Dedicated Template1 ▽ | EP Transport test - N3 ✎ | - |

1002 — [Check for Feasibility]

[Previous]   [Cancel] [Next]

Orchestrator

LCM > ... > Create New Slice Design

○ Basic Information — ○ Slice Definition — ○ Slice Subnet Profile — ◉ SLAs — ○ Preview 🔍 Search    All ⌄

Configure Automation Policies

🔍 Search  1306    RAN ⌄    1310

- Max Number of UEs
- Latency
- Resource Sharing Level
- Downlink Throughput Per Slice (Mbps)
- Downlink Throughput Per UE (Mbps)

1308

| Max Number of UEs ✕ | Downlink Throughput Per Slice (Mbps) ✕ | Downlink Throughput Per UE (Mbps) ✕ |
| Uplink Throughput Per Slice (Mbps) ✕ | Uplink Throughput Per UE (Mbps) ✕ | Availability (%) ✕ |

1302

Select Policy to Trigger
Policy Name*

MME TOTSUKA Auto Scale up Policy 🔍  1304

CR Information

CR Title / CR ID*

Addition of Lcoation CR-GEN-110920-129980028498.1 🔍    LMP ID  9251

⬇ LAB Test Result Release Certificate    LMP-Ticket Details

[Previous]                              [Cancel] [Next]

SYSTEM AND METHOD FOR UNIFICATION OF POLICY ONBOARDING

RELATED APPLICATIONS

The present application is a National Phase of International Application No. PCT/US2022/044371, filed Sep. 22, 2022.

TECHNICAL FIELD

This description relates to a system for unification of policy onboarding and method of using the same.

BACKGROUND

A cellular network is a telecommunication system of mobile devices (e.g., mobile phone devices) that communicate by radio waves through one or more local antenna at a cellular base station (e.g., cell tower). Cellular service is provided to coverage areas that are divided into small geographical areas called cells. Each cell is served by a separate low-power-multichannel transceiver and antenna at the cell tower. Mobile devices within a cell communicate through that cell's antenna on multiple frequencies and on separate frequency channels assigned by the base station from a pool of frequencies used by the cellular network.

A radio access network (RAN) is part of the telecommunication system and implements radio access technology. RANs reside between a device, such as a mobile phone, a computer, or remotely controlled machine, and provides connection with a core network (CN). Depending on the standard, mobile phones and other wireless connected devices are varyingly known as user equipment (UE), terminal equipment (TE), mobile station (MS), and the like.

SUMMARY

In some embodiments, a method for policy onboarding includes receiving, by a processor, a request from a network slice service builder module for registration of an application bundle; requesting, by the processor, a central inventory create an application bundle object; requesting, by the processor, a policy manager create a policy descriptor file corresponding to one or more rule-based policies and the application bundle; and receiving, by the processor, a policy identifier (ID) for the application bundle from the policy manager.

In some embodiments, an apparatus includes a processor; and a memory having instructions stored thereon that, when executed by the processor, cause the processor to receive a request from a network slice service builder module for registration of an application bundle; request central inventory create an application bundle object; request a policy manager create a policy descriptor file corresponding to one or more rule-based policies and the application bundle; and receive a policy identifier (ID) for the application bundle from the policy manager.

In some embodiments, a non-transitory computer readable medium having instructions stored thereon that, when executed by a processor, cause the processor to receive a request from a network slice service builder module for registration of an application bundle; request central inventory create an application bundle object; request a policy manager create a policy descriptor file corresponding to one or more rule-based policies and the application bundle; and receive a policy identifier (ID) for the application bundle from the policy manager.

BRIEF DESCRIPTION OF THE DRAWINGS

Aspects of the present disclosure are understood from the following detailed description when read with the accompanying FIGS. In accordance with the standard practice in the industry, various features are not drawn to scale. In some embodiments, dimensions of the various features are arbitrarily increased or reduced for clarity of discussion.

FIGS. 3-15 are graphic user interfaces (GUIs) for designing a network slice, in accordance with some embodiments.

DETAILED DESCRIPTION

Figure 1:
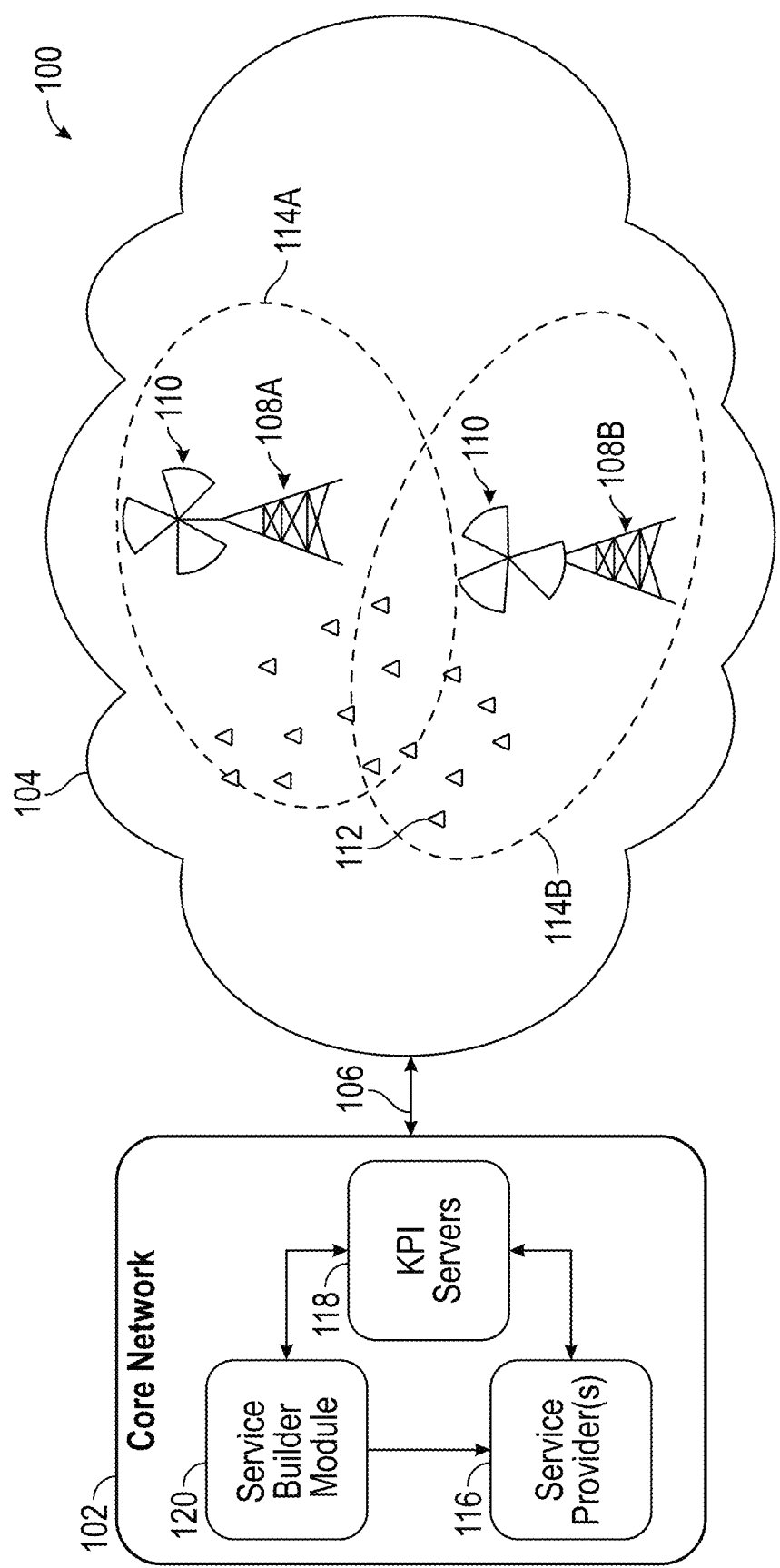
FIG. 1 is a diagrammatic representation of a system for network slice design (NSD), in accordance with some embodiments.

The following disclosure provides many different embodiments, or examples, for implementing distinctive features of the discussed subject matter. Examples of components, values, operations, materials, arrangements, or the like, are described below to simplify the present disclosure. These are, of course, examples and are unintended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to be in direct contact. In addition, the present disclosure repeats reference numerals and/or letters in the numerous examples. This repetition is for the purpose of simplicity and clarity and is unintended to dictate a relationship between the various embodiments and/or configurations discussed.

Further, spatially relative terms, such as beneath, below, lower, above, upper and the like, are used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

In some embodiments, a system and method for unification of policy onboarding is discussed. Policy-based management is a technology that simplifies the complex task of managing networks and distributed systems. Under this paradigm, an administrator manages different aspects of a network or distributed system in a flexible and simplified manner by deploying a set of policies that govern behavior. Policies are technology independent rules that aim to enhance the hard-coded functionality of managed devices by introducing interpreted logic that dynamically changes without modifying the underlying implementation. This allows for a certain degree of programmability without interrupting the operation of either the managed system or of the management system. Policy-based management significantly increases the self-managing aspects of distributed systems or networks, leading to more autonomic behavior demonstrated by autonomic computing systems.

In other approaches, rule-based policy applications are exposed directly to a larger and larger user community; both external and internal. This exposure crates security concerns due to exposure of the rule-based policy applications to an ever-growing community. Further, users of the rule-based policy applications have a steep learning curve to understand different rule-based policy modules. In other approaches, policy onboarding is done through a network service designer as a policy bundle. While these prior systems have different security tools like jfrog (a universal development operations (devops) solution providing end-to-end automation and management of binaries and artifacts through the application delivery process) and sonar (which analyses source code to detect tricky issues like bugs, code smells, and security vulnerabilities that impact code quality) which scan the artifacts of the bundle in the entire process. While these other approaches provide a medium amount of security, in some embodiments, the procedure suggested here would enable advance security mechanisms. In some embodiments, a unified policy onboarding solution is configured to make onboarding more efficient by automated scanning that reduces security concerns.

A rule-based system is used to store and manipulate knowledge to interpret information in a useful way. Normally, the term rule-based system is applied to systems involving human-crafted or curated rule sets.

In some embodiments, a unified policy onboarding solution, such as a network function/network services (NF)/(NS) package onboarding, mitigates both security concerns as well as levelling out the learning curve for policy management users.

In some embodiments, policy-definition unification allows the network day 2 assurance policies to be bundled together with the day 1 NF/NS package onboarding. Day 1 operations describe the deployment stage, where installation, set up, and configuration of software occurs. Day 2 is the maintenance stage. Typical Day 2 operations are focused around maintaining, monitoring, and optimizing the system. Day 2 operations continue throughout the product lifecycle, as the system behavior is continuously analysed and patched. Typically, the service designer through the orchestrator workflow creates the Day 1 network function (NF) or network service (NS) instantiation automation processes. Policy engine process typically occurs on a Day 2 operation support engine which enables automated assurance. In some embodiments, the Day 1 and Day 2 processes are bundled together.

In some embodiments, policy-definition unification allows unified onboarding automation which has several benefits, such as policy package scanning during bundle creation to report potential vulnerabilities and policy templates are validated as per the schema defined during policy bundle creation. In some embodiments, the policy bundle creation simplifies the day 2 policy-based assurance service creation. In some embodiments, in response to a unified policy definition being created, then service onboarding tools validates the format of the JSON policy to ensure the policy is in a correct format. The service onboarding tools further determine whether a policy defined per standard guidelines and whether the policy is granted root access of a network element. Service assurance, in telecommunications, is the application of policies and processes by a communications service provider (CSP) to ensure that services offered over networks meet a pre-defined service quality level for an optimal subscriber experience. The practice of service assurance enables CSPs to identify faults in the network and resolve these issues in a timely manner to minimize service downtime. The practice further includes policies and processes to proactively pinpoint, diagnose and resolve service quality degradations or device malfunctions before subscribers are impacted.

In some embodiments, a network service (NS) bundle is a bundle which includes technology services, configuration, manifest files, or other suitable services and files within the scope of some embodiments. The technology services are further subdivided into different network service descriptors (NSDs) and virtualized network function descriptors (VNFDs). In some embodiments, the VNFDs are created with application bundles. A policy descriptor is part of the application bundles as discussed below.

An application bundle file is a single, relocatable file that contains the artifacts to run an application. An application bundle file is set to run on an instance (or instantiation). Application files are relocated by moving the application bundle file. Except for system libraries, the application bundle file includes toolkit artifacts that are used to run the application. The application does not access external toolkits when running on execution hosts (e.g., a subscriber on a smartphone). Logically, an application bundle file includes parts of the application directory and the output directory, plus subdirectories from toolkits that contributed to the application. When an application bundle file is submitted for execution, the application bundle file is deployed to all hosts on which the application runs. The application bundle file is then unbundled into a runtime application directory hierarchy that is similar to a compile-time hierarchy with the addition of any external toolkit entities. An application bundle file has an identifier that uniquely distinguishes one build of an application from another. When an application bundle file is submitted for execution, the identifier is used to check whether there is another instance of the same application already running, and if so, it shares the unbundled execution location. In this case, the same runtime application directory hierarchy is used for all executions of a given application bundle file.

A NSD is a deployment template which includes information used by the network function virtualization orchestrator (NFVO) for life cycle management of a NS. An NS is a composition of NFs arranged as a set of functions with unspecified connectivity between the NFs or according to one or more forwarding graphs.

A network slice (a portion of the original network architecture that is divided or sliced into multiple logical and independent networks that are configured to effectively meet the various services requirements) is broken up into subnets where each subnet is dedicated to a specific domain (e.g., RAN, CN, transport domain, or end-to-end (E2E) that includes each). The transport domain references the telecommunication transmission facilities under which voice, data, and video communications are distributed between distant locations for use on a shared basis.

Within a subnet is one or more network services (NSs) or a bundle of network services. For example, within a RAN slice subnet is a network service, such as g node B (gNB is a third-generation partnership project (3GPP) 5G next generation base station which supports 5G new radio). Within a CN slice subnet is a network service, such as NRF (a network repository function which is a function of the 3GPP service-based architecture (SBA) for 5G CNs acting as a central services broker for all NFs in the 5G CN) or AMF (access and mobility management function that receives connection and session related information from the UE for handling connection and mobility management tasks). Within a transport slice subnet is a transport network service.

Within a network service is one or more network functions (NFs) or a bundle of network functions. For example, within a gNB network service are network functions, such as DU (a distributed unit supports one or more cells supporting radio link control (RLC), medium access control (MAC) and the physical layer), CUCP (central unit control plane hosts radio resource control (RRC) and the control-plane part of the packet data convergence protocol (PDCP)), and CUUP (central unit user plane is a logical node hosting the user plane part of the PDCP protocol of the gNB-CU for a gNB, and the user plane part of the PDCP protocol of the gNB-CU for an en-gNB or a gNB).

Within a NRF network service are network functions, such as MongoDB (an open-source NoSQL database management program), NRF (provides a single record of NFs available in each public land mobile network (PLMN), together with the profile of each network function and the services supported) and Redis (an in-memory data structure store, used as a distributed, in-memory key-value database, cache and message broker, with optional durability). Further, within an AMF network service are network functions such as Nginx (an open-source Web server software that performs reverse proxy, load balancing, email proxy, and HTTP cache services), AMF application, and database (DB).

Within a transport network service are network functions, such as software (SW), SDN (an approach to network management that enables dynamic, programmatically efficient network configurations to improve network performance and monitoring, more like cloud computing than traditional network management), and router (a networking device that forwards data packets between computer networks).

In some embodiments, an application bundle (e.g., a bundle containing the executable code of an application and its associated resources) is registered at an orchestrator bundle catalog (orchestration is the automated configuration, coordination, and management of computer systems and software). An onboarding service creates the bundle/package objects in a central inventory. The onboarding service sends a request to a policy manager for creating the policy descriptor files (without source element UUIDs, which are 128-bit labels used for information in computer systems).

A policy manager determines the degree to which a service/device is allowed to do what the service/device is attempting/requesting (decision), and is then able to enforce the decision (enforcement). Some examples of policies include (1) is the customer allowed to use this service, (2) is there enough capacity to support this new service, (3) what happens to non-SLA (service level agreement) customers when a node approaches congestion, and (4) is the service request/activity a security threat?

The policy manager sends back a policy ID to the orchestrator and the orchestrator stores the policy ID with the package ID. A NF instantiation request is received from a user (e.g., instantiate a NF using a NFT which includes a policy descriptor file with policy ID). An NFT or non-fungible token includes digital data stored in a blockchain, a form of distributed ledger. The ownership of an NFT is recorded in the blockchain and is transferred by the owner.

The instance is created in a central inventory. The orchestrator deploys the NF/application and sends notification to the policy manager for enabling the policies with respective policy IDs. The policy files are modified with pending (source element UUID or the like) information. After modifying the pending information, the descriptor is referenced as policy template. Now the policy template is ready for activation by a user.

In some embodiments, in response to the orchestrator receiving a NF termination request, the policy manager is notified about the terminated NF and corresponding information. At the policy manager the policy template is modified accordingly (i.e., the policy is deactivated for respective NF which is terminated).

FIG. 1 is a diagrammatic representation of a system for network slice design (NSD) 100, in accordance with some embodiments.

NSD system 100 includes a CN 102 communicatively connected to RAN 104 through transport network 106, which is communicatively connected to base stations 108A and 108B (hereinafter base station 108), with antennas 110 that are wirelessly connected to UEs 112 located in geographic coverage cells 114A and 114B (hereinafter geographic coverage cells 114). CN 102 includes one or more service provider(s) 116, KPI servers 118, and service builder module 120.

CN 102 (further known as a backbone) is a part of a computer network which interconnects networks, providing a path for the exchange of information between different local area networks (LANs) or subnetworks. In some embodiments, CN 102 ties together diverse networks over wide geographic areas, in different buildings in a campus environment, or in the same building.

In some embodiments, RAN 104 is a global system for mobile communications (GSM) RAN, a GSM/EDGE RAN, a universal mobile telecommunications system (UMTS) RAN (UTRAN), an evolved UMTS terrestrial radio access network (E-UTRAN), open RAN (O-RAN), or cloud-RAN (C-RAN). RAN 104 resides between UE 112 (e.g., mobile phone, a computer, or any remotely controlled machine) and CN 102. In some embodiments, RAN 104 is a C-RAN for purposes of simplified representation and discussion. In some embodiments, base band units (BBU) replace the C-RAN.

In conventional distributed cellular networks, equipment at the bottom and top of a base station of a cell site is the BBU. The BBU is radio equipment that links UEs to the CN and processes billions of bits of information per hour. The BBU was traditionally placed in an enclosure or shelter situated at the bottom of a base station. C-RAN, in contrast, uses fiber optic's large signal-carrying capacity to centralize numerous BBUs at a dedicated pool location or a base station. This reduces the quantity of equipment at base stations and provides many other advantages, including lower latency.

In a hierarchical telecommunications network, transport network 106 of NSD system 100 includes the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul refers to the side of the network that communicates with the Internet. The connection between base station 108 and UE 112 begins with transport network 106 connected to CN 102. In some embodiments, transport network 106 includes wired, fiber optic, and wireless components. Wireless sections include using microwave bands, mesh, and edge network topologies that use high-capacity wireless channels to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a remote radio head (RRH), primary and backup electrical power sources, and sheltering. Base stations are known by other names such as base transceiver station, mobile phone mast, or cell tower. In some embodiments, other edge devices are configured to wirelessly communicate with UEs. The edge device provides an entry point into service provider CNs, such as CN 102. Examples include routers, routing switches, integrated access devices (IADs), multiplexers, and a variety of metropolitan area network (MAN) and wide area network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc are 60°, 90°, or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or ultra-high frequency (UHF) frequencies (300 MHz to 3 GHz). In other examples, antenna(s) 110 are chosen for their size and directional properties. In some embodiments, the antenna(s) 110 are MIMO (multiple-input, multiple-output) antennas that send and receive greater than one data signal simultaneously over the same radio channel by exploiting multipath propagation.

In some embodiments, UEs 112 are a computer or computing system. Additionally, or alternatively, UEs 112 have a liquid crystal display (LCD), light-emitting diode (LED) or organic light-emitting diode (OLED) screen interface, such as user interface (UI) 1922 (FIG. 19), providing a touchscreen interface with digital buttons and keyboard or physical buttons along with a physical keyboard. In some embodiments, UE 112 connects to the Internet and interconnects with other devices. Additionally, or alternatively, UE 112 incorporates integrated cameras, the ability to place and receive voice and video telephone calls, video games, and Global Positioning System (GPS) capabilities. Additionally, or alternatively, UEs run operating systems (OS) that allow third-party apps specialized for capabilities to be installed and run. In some embodiments, UEs 112 are a computer (such as a tablet computer, netbook, digital media player, digital assistant, graphing calculator, handheld game console, handheld personal computer (PC), laptop, mobile Internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In some embodiments, geographic coverage cells 114 include a shape and size. In some embodiments, geographic coverage cells 114 are a macro-cell (covering 1 Km-30 Km), a micro-cell (covering 200 m-2 Km), or a pico-cell (covering 4 m-200 m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and UEs 112 are configured to communicate.

Service provider(s) 116 or CSPs are businesses, vendors, customers, or organizations that sell bandwidth or network access to subscribers (utilizing UEs) by providing direct Internet backbone access to Internet service providers and usually access to network access points (NAPs). Service providers are sometimes referred to as backbone providers, Internet providers, or vendors. Service providers include telecommunications companies, data carriers, wireless communications providers, Internet service providers, and cable television operators offering high-speed Internet access.

KPI servers 118 produce both predictions and live network data. Live-network data (KPIs, UE/cell/MDT (minimization of drive test) traces, and crowdsourced data) that allows for modelling of network traffic, hot-spot identification, and radio signal propagation. RF drive testing is a method of measuring and assessing the coverage, capacity, and Quality of Service (QoS) of a mobile radio network, such as RAN 104. The technique consists of using a motor vehicle containing mobile radio network air interface measurement equipment that detects and records a wide variety of the physical and virtual parameters of mobile cellular service in each geographical area. By measuring what a wireless network subscriber experiences in an area, wireless carriers make directed changes to networks that provide better coverage and service to customers. Drive testing commonly is configured with a mobile vehicle outfitted with drive testing measurement equipment. The equipment is usually highly specialized electronic devices that interface to original equipment manufacturer (OEM) mobile handsets (UEs). This ensures measurements are realistic and comparable to actual user experiences. For mobile networks, crowdsourcing methodology leverages a crowd of participants (e.g., the mobile subscribers) to gather network measurements, either manually or automatically through mobile apps, or directly from the network using call traces.

UE/cell/MDT traces collected at the operations support systems (OSS) or through dedicated tools provide service provider(s) 116 with user-level information. Once geolocated, UE/cell/MDT traces are used to enhance path-loss calculations and prediction plots, as well as to identify and locate problem areas and traffic hotspots. KPI servers 118 allow service provider(s) 116 to use UE/cell/MDT traces along with service builder module 120 for network optimization.

In some embodiments, service builder module 120 is configured to allow a user to design one or more network slices. In some embodiments, the network slice design is GUI based. In some embodiments, operations include a user inputting basic information such as, network slice name, slice type, domains, and shared or non-shared slice selection. Other operations include defining a slice such as, service profile parameters (holds the original requirement of communication-service-instance, such as latency, data-rate, and mobility-level) requested by a northbound interface (e.g., internal to the system or manually from a user) and conversion of service profile parameters to slice profile parameters (holds the slice subnet parameter info of different network domain slice subnet instances (NSSIs), such as RAN, transport network (TN), and CN NSSI).

In some embodiments, service builder module 120 is configured to unify policy onboarding, such as a network function/network services (NF)/(NS) package onboarding. In some embodiments, service builder module 120 bundles network day 2 assurance policies with day 1 NF/NS packages.

Figure 2:
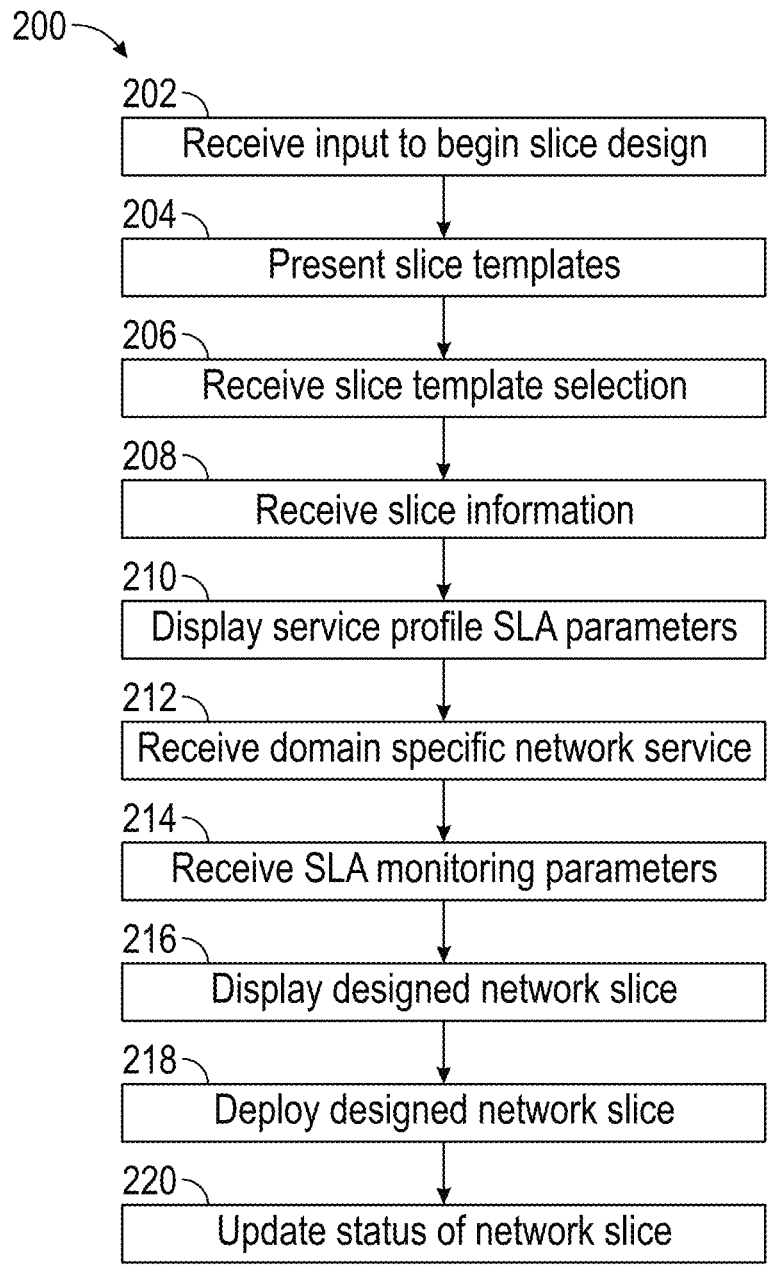
FIG. 2 is a flow diagram of method for designing a network slice, in accordance with some embodiments.
Figure 3:
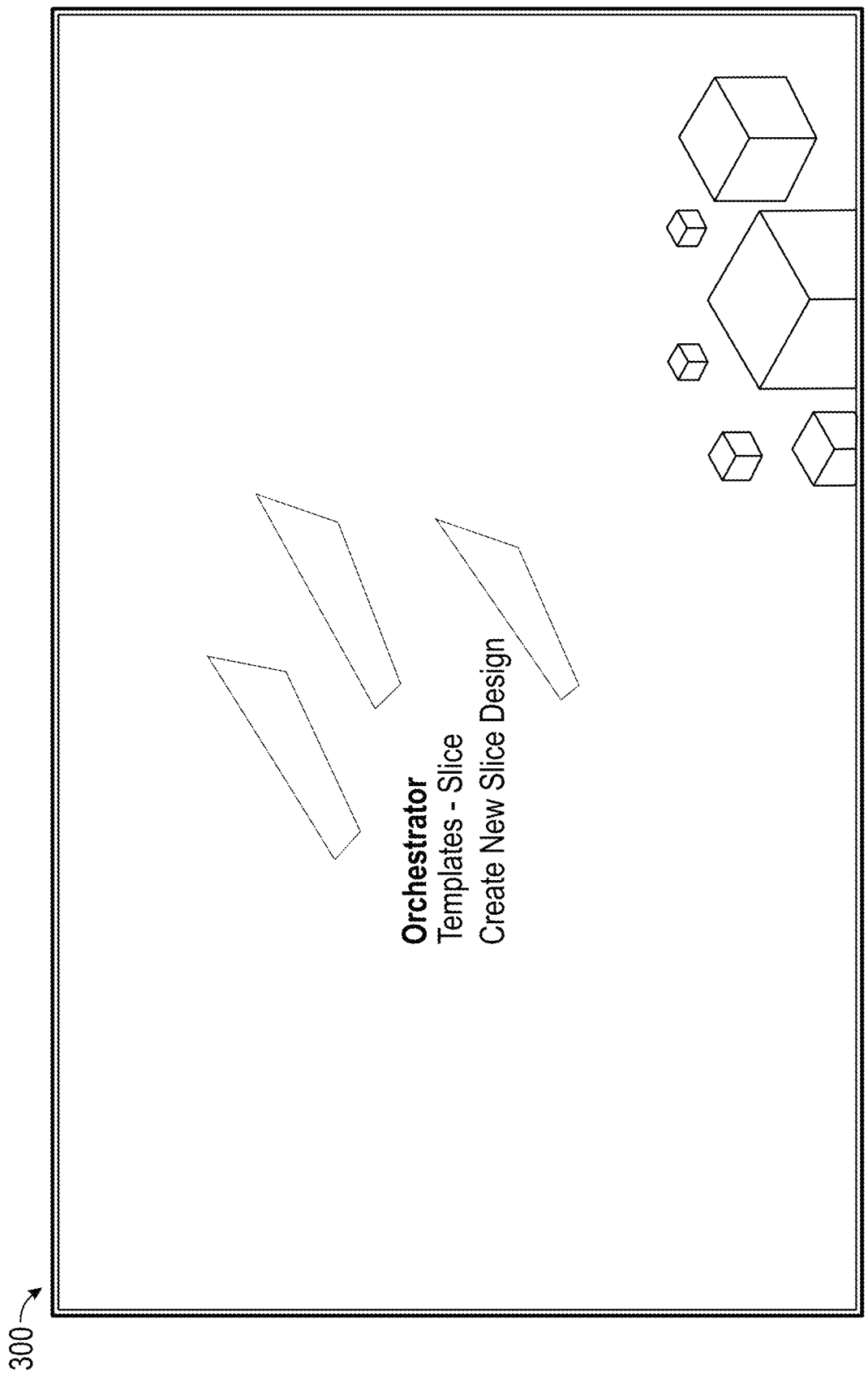

FIG. 2 is a flow diagram for a method of designing a network slice 200, in accordance with some embodiments.

FIGS. 3-15 are graphic user interfaces (GUIs) 300-1500 for designing a network slice, in accordance with some embodiments.

In some embodiments, NSD method 200 describes process tasks of network slice design. While the operations of NSD method 200 are discussed and shown as having a particular order, each operation in NSD method 200 is configured to be performed in any order unless specifically called out otherwise. NSD method 200 is implemented as a set of operations, such as operations 202 through 220. Further, NSD method 200 is discussed with reference to FIGS. 3-15 to assist in the understanding of NSD method 200.

At operation 202 of NSD method 200, service builder module 120 receives an input from a user to begin network slice design. In some embodiments, the user is presented with GUI 300 indicating a network slice design application is starting. Process flows from operation 202 to operation 204.

At operation 204 of NSD method 200, service builder module 120 presents a list of slice templates. In FIG. 4, GUI 400 displays slice template list 402. In some embodiments, each network slice in slice template list 402 includes a status (e.g., active, or inactive), a name, a slice service type (e.g., eMBB, uRLLC, mIoT, or custom), a service category (such as home automation, high speed train, etc.), a domain (RAN, TN, CN, or E2E), a vendor, version, shared (or not), created date, and last modified date. The term template refers to a feature of a software application that defines a unique non-executable file format intended specifically for that application. Process flows from operation 204 to operation 206.

At operation 206 of NSD method 200, service builder module 120 receives a user input indicating a selection of a slice template. In FIG. 4, a user points to a slice template, for example slice template 404, then clicks on the slice template. Create new slice user selection button 406 pops up and the user clicks on user selection button 406 to begin the process of creating a new slice with the selected slice template. Process flows from operation 206 to operation 208.

At operation 208 of NSD method 200, GUI 500 is presented, and the user inputs basic slice information. In FIG. 5, a user inputs a slice name in user input field 502, selects a slice type from user selection field 504 (e.g., eMBB or URLLC type of slice), selects domains from user selection field 506, and selects whether the slice is shared or dedicated from user selection field 508. For example, the user selects a shared or dedicated slice subnet for each domain (RAN at user selection field 508A, core at user selection field 508B, transport at user selection field 508C, or a combination of each) and coverage area of the network slice at user selection field 510. Within user selection field 512, the PLMN is chosen. In some embodiments, the PLMN selection is based upon the coverage area selected in user selection field 510. Process flows from operation 208 to operation 210.

At operation 210 of NSD method 200, GUI 600 is presented, and the user sets network slice parameters. In FIG. 6, at slice parameter GUI 600, service profile SLA parameters 602 are presented and configured so the user modifies the parameters as applicable. In a non-limiting example, a user modifies an expected latency to fit the specifications of the network slice at user selection field 604 (e.g., set at 300 ms). Once the user confirms all service profile parameters within parameter field 602, for the complete end to end network slice, the user points and clicks on calculate user selection button 606. In some embodiments, this process is repeated for each domain. A slice manager (1702 FIG. 1700) calculates slice profile parameters (shown in slice profile box 608) of each domain (RAN, CORE, and transport) to meet service profile SLAs. Process flows from operation 210 to operation 212.

Figure 7:
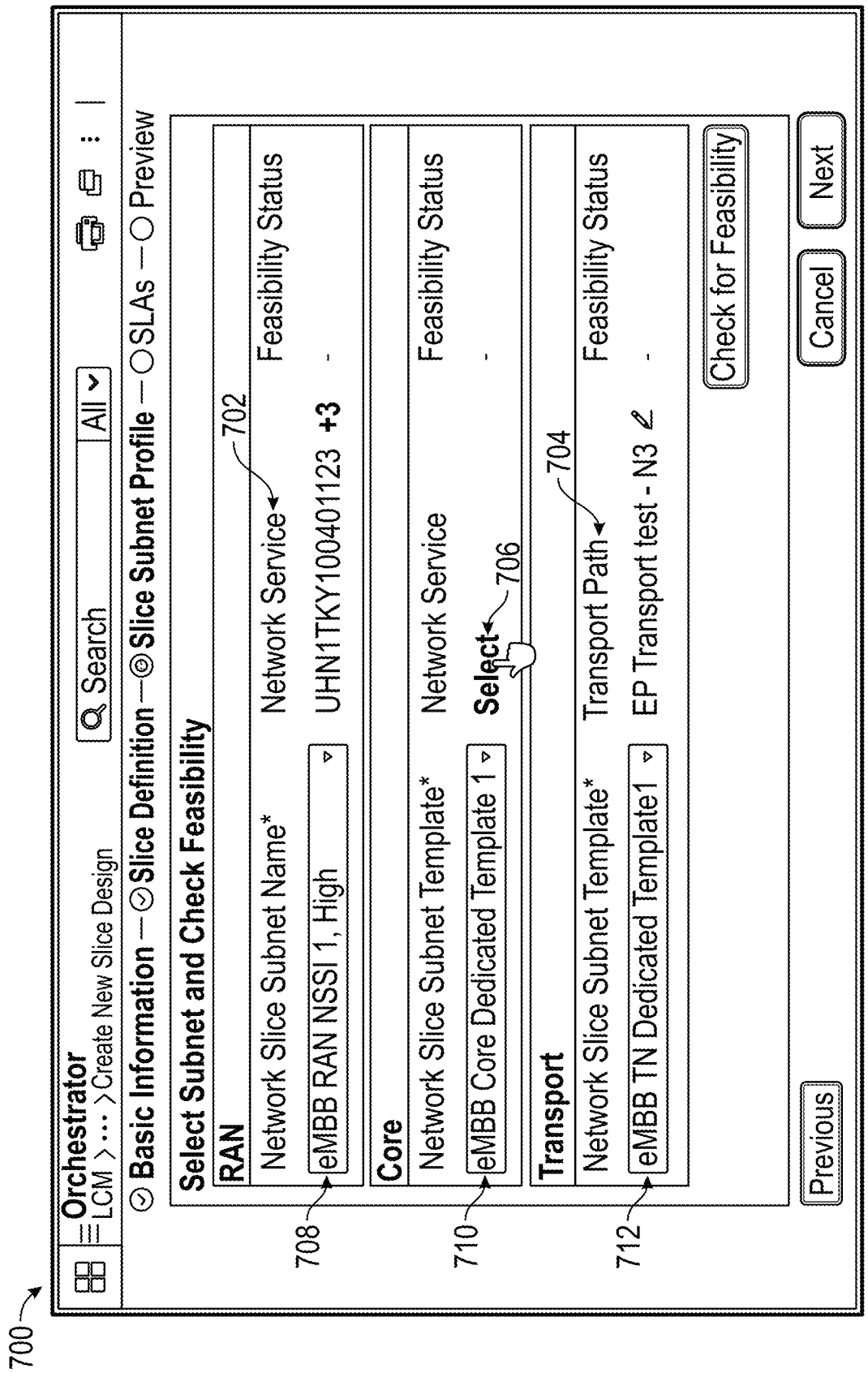

At operation 212 of NSD method 200, GUI 700 is presented, and the user selects a subnet profile, such as an already deployed domain specific network service (a shared network service or a dedicated network service). In FIG. 7, the user navigates to slice subnet profile GUI 700, where the user selects a network slice subnet name for each domain from user selection fields 708, 710, and 712. A network service associated with the slice subnet is displayed at locations 702 and 704. In response to a network service being absent from the network slice subnet, user is further able to select a network service template (where the domain is dedicated) by pointing and clicking on select user selection field 706.

Figure 8:
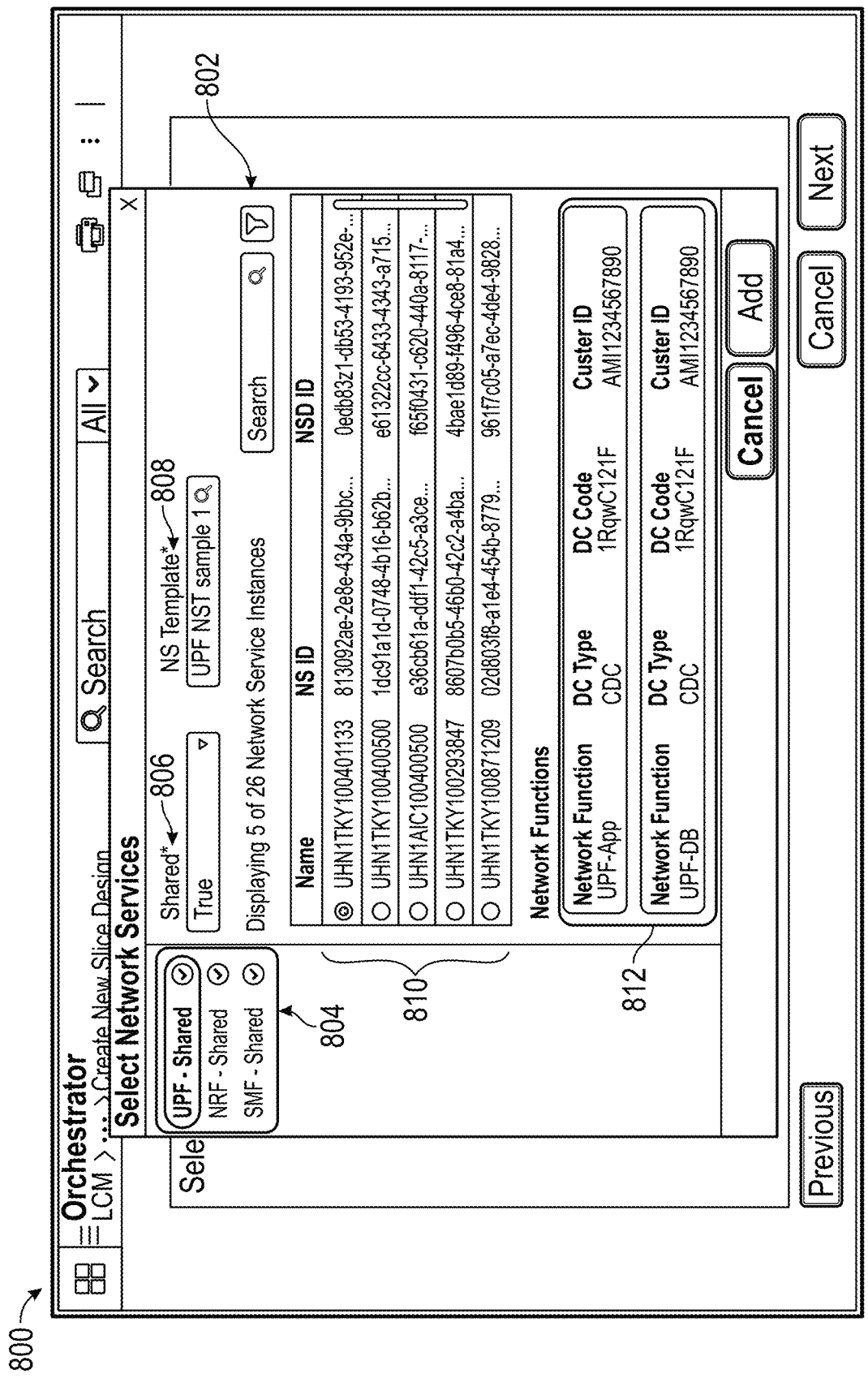

In FIG. 8, GUI 800 is presented after the user clicks on select user selection field 706, and the user is presented with a select network services pop-up box 802. As shown in network services box 804, each of the network services, such as user plane function (UPF is responsible for packet routing and forwarding, packet inspection, quality of service (QOS) handling, and external protocol data unit (PDU) session for interconnecting data network (DN) in a 5G architecture), network repository function (NRF acts as a central services broker for all network functions (NFs) in the 5G Core), or session management function (SMF is responsible for interacting with the decoupled data plane, creating updating and removing PDU sessions and managing session context with the UPF). In a non-limiting example, a user selects UPF (shown as highlighted) and within shared user input field 806 a user is presented with an indication (e.g., true) that the UPF network service is shared. A network services template name is displayed in user input field 808. A user selects network services from network services list 810. Box 812 displays the network functions associated with the selected network services selected by the user from network services list 810.

Figure 9:
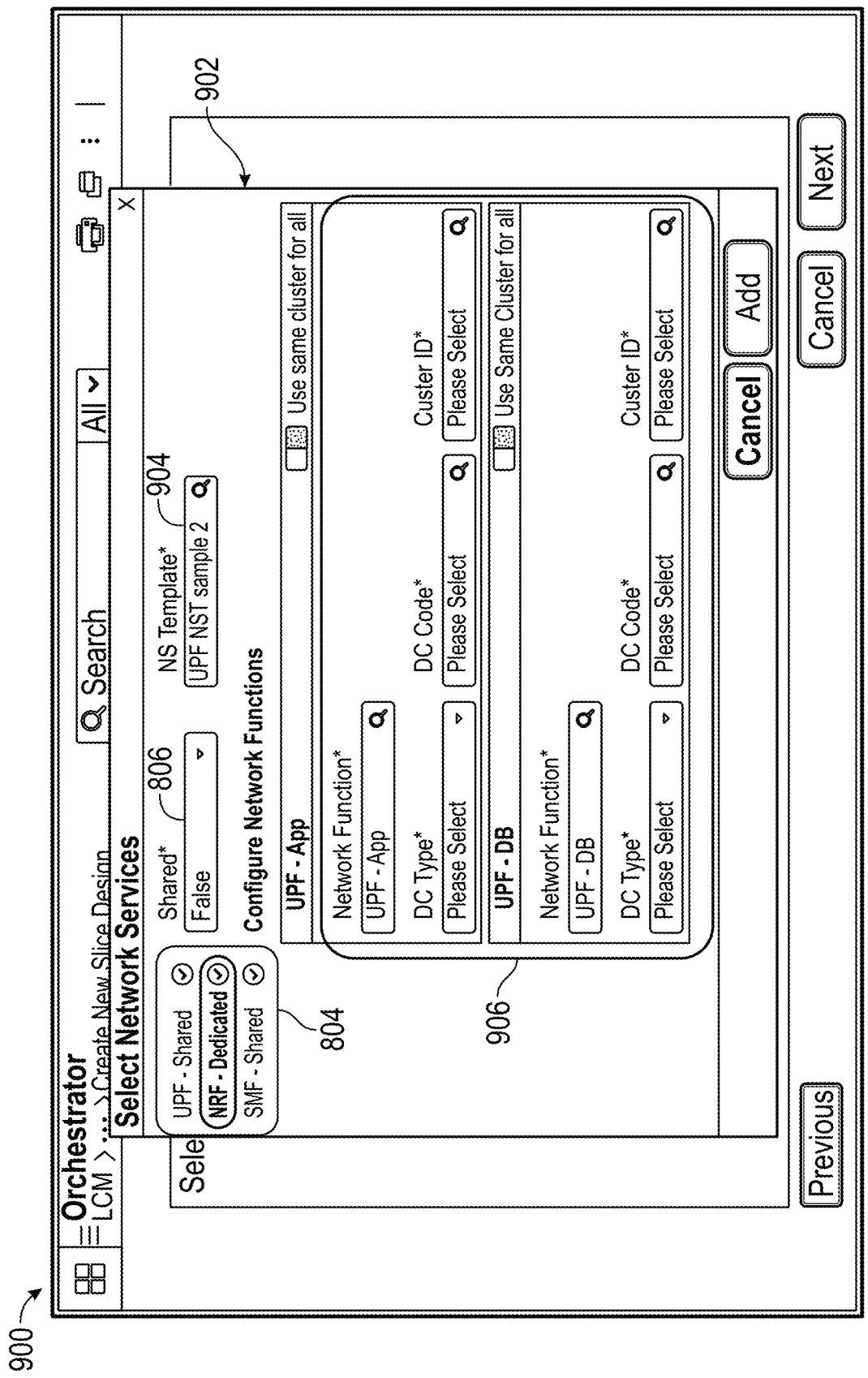

Alternatively, in FIG. 9, GUI 900 displays NRF as highlighted in network services box 804 and false being presented within shared user input field 806 indicating the NRF network service is not shared. Thus, a user fills out template 902 for a dedicated network service. The user selects a network services template in NS template user selection field 904. In response to selection of a network service template (e.g., UPF NST sample 2), the user is presented with network functions box 906. In network functions box 906 the user selects a network function (such as UPF app and UPF DB where the user selects the distributed unit type, distributed unit code, and cluster ID).

In FIG. 10, GUI 1000 is presented after each of the domains (RAN, core, and transport) include a network service. Once each domain includes a network service, the user points and clicks on feasibility user selection field 1002 and service builder module 120 determines whether the selected network services are ready to serve the new network slice.

Figure 11:
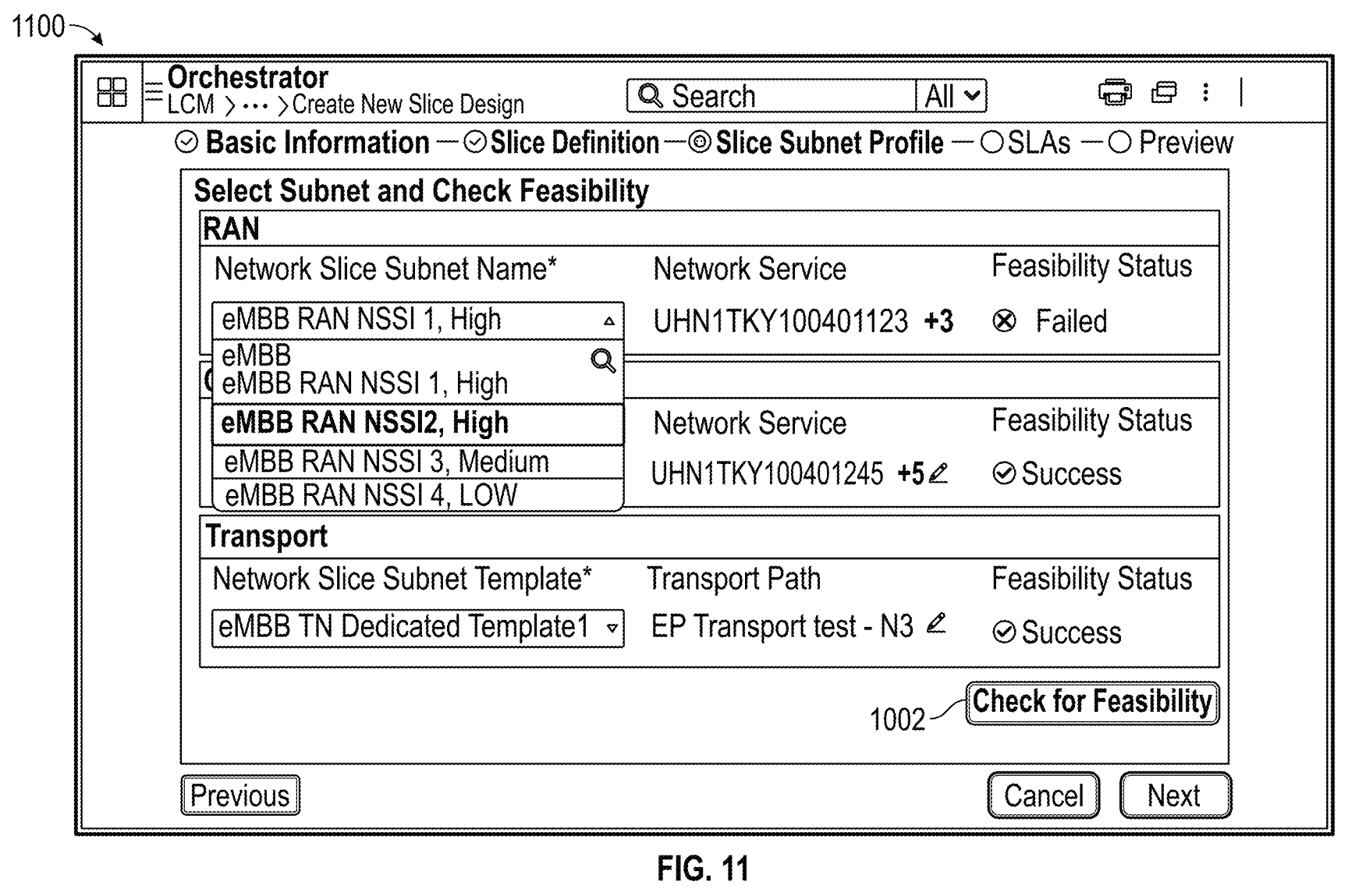

In FIG. 11, GUI 1100 is presented when the feasibility test fails for one or more domains (e.g., the RAN domain). The user clicks on NS subnet name user selection field 1102 to select another slice subnet and recheck the feasibility by clicking on feasibility user selection field 1002.

Figure 12:
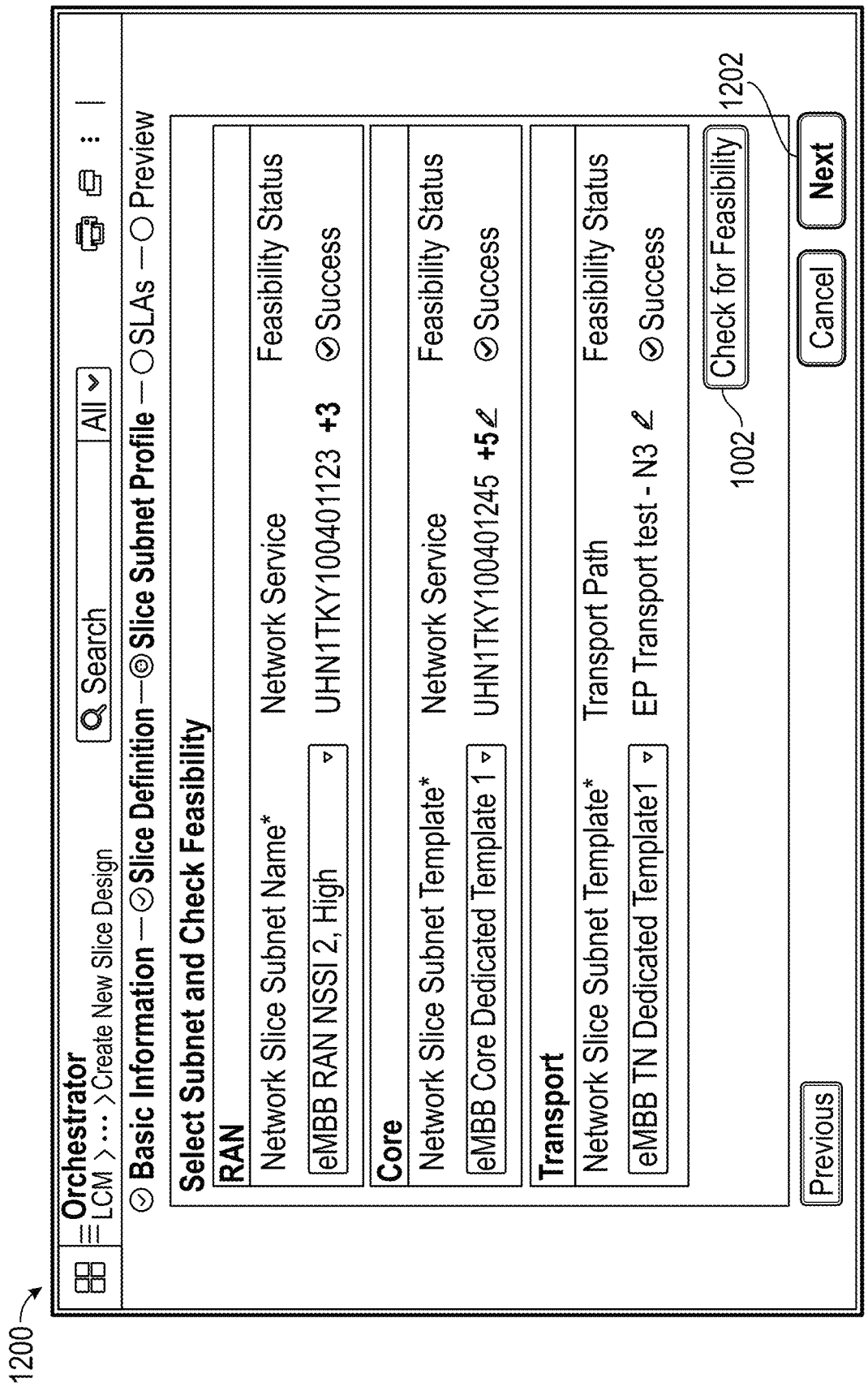
Figure 15:

In FIG. 12, GUI 1200 is presented when the feasibility test is successful for each domain. The user clicks next user selection button 1202 to deploy the network slice. Process flows from operation 212 to operation 214.

At operation 214 of method 200, GUI 1300 is presented (FIG. 13), and the user selects SLA parameters, such as parameters and KPIs shown in parameter box 1302, to be monitored for the network slice based on one or more SLA agreements. A user searches for parameters or KPIs within search user input field 1306 for a selected domain shown in user selection field 1310. In some embodiments, the user drags and drops parameters/KPIs 1308 to parameter box 1302. Further, in response to the slice being deployed and the selection of parameters/KPIs (box 1302) to be monitored, the user selects a policy, from policy name user selection field 1304 for slice automated healing use-cases. Auto healing is a function that automatically detects disabled access points and restores the wireless network. Process flows from operation 214 to operation 216.

At operation 216 of method 200, designed network slice 1402 is displayed on GUI 1400 (FIG. 14) for the user's review. After previewing network slice 1402, including service information 1404 and automation policies 1406, the user clicks on submit user selection field 1408 after a determination the information is correct. In response to submit user selection field 1408 being clicked, GUI 1500 (FIG. 15) is displayed with a list of network slices 1502. Process flows from operation 216 to operation 218.

At operation 218 of method 200, a user deploys the designed network slice by clicking on the desired network slice in list of network slices 1502, which displays pop up box 1504 of GUI 1500. The user clicks on deploy user selection button 1506 to deploy the designed slice. In some embodiments, the slice manager (1702 FIG. 1700) makes an API call to the orchestrator (1760 FIG. 1700) and the designed slice is deployed. Process flows from operation 218 to operation 220.

At operation 220 of method 200, the status of the designed slice is updated. As seen in status box 1508, the status of the network slice is updated from designed to deployed. Other statuses include running, activation failed, deployment failed.

Figure 16:
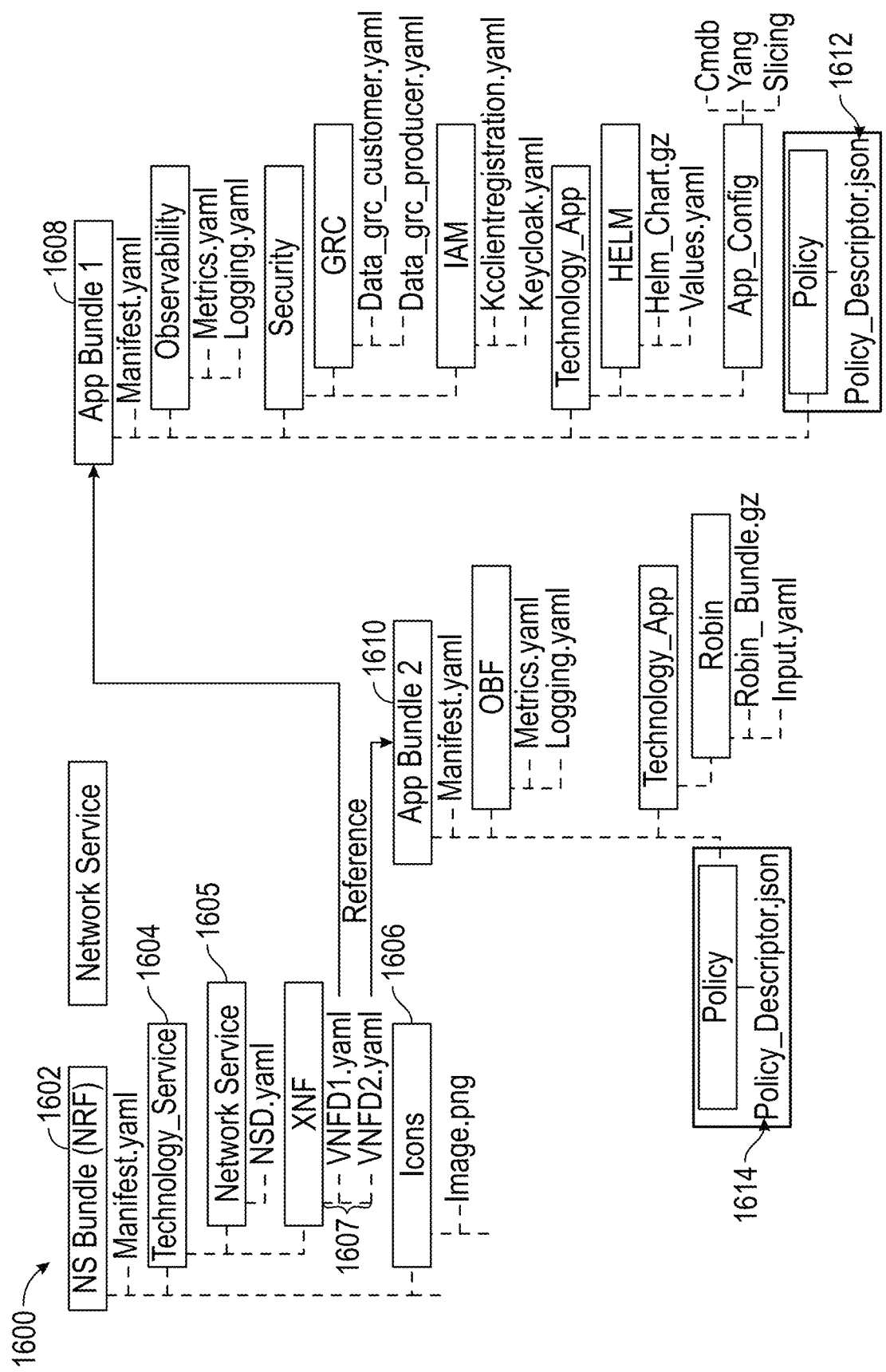
FIG. 16 is a pictorial representation of a universal network service bundle, in accordance with some embodiments.

FIG. 16 is a pictorial representation of a universal network service bundle 1600, in accordance with some embodiments.

For purposes of this discussion, application and network function are used interchangeably unless otherwise distinguished from one another.

In FIG. 16, a network service bundle 1602 is an amalgamation of technology services 1604 (and other services like icons 1606) which is further subdivided into different NSDs 1605 and VNFDs 1607. In some embodiments, VNFDs 1607 are created with application bundles 1608, 1610. In some embodiments, a policy descriptor 1612 and 1614 are part of application bundles 1608 and 1610. In some embodiments, policy descriptor files 1612 and 1614 are of a json format. In some embodiments, the policy bundle is part of network service (NS)/(NF) network function bundle which includes other artifacts such as technology app images, metrices, config files, or other suitable files within the scope of some embodiments.

JSON is an open standard file format and data interchange format that uses human-readable text to store and transmit data objects consisting of attribute-value pairs and arrays (or other serializable values). JSON is a data format with diverse uses in electronic data interchange, including that of web applications with servers. JSON is a language-independent data format. JSON was derived from JavaScript, but many modern programming languages include code to generate and parse JSON-format data. JSON filenames use the extension json.

Figure 17:
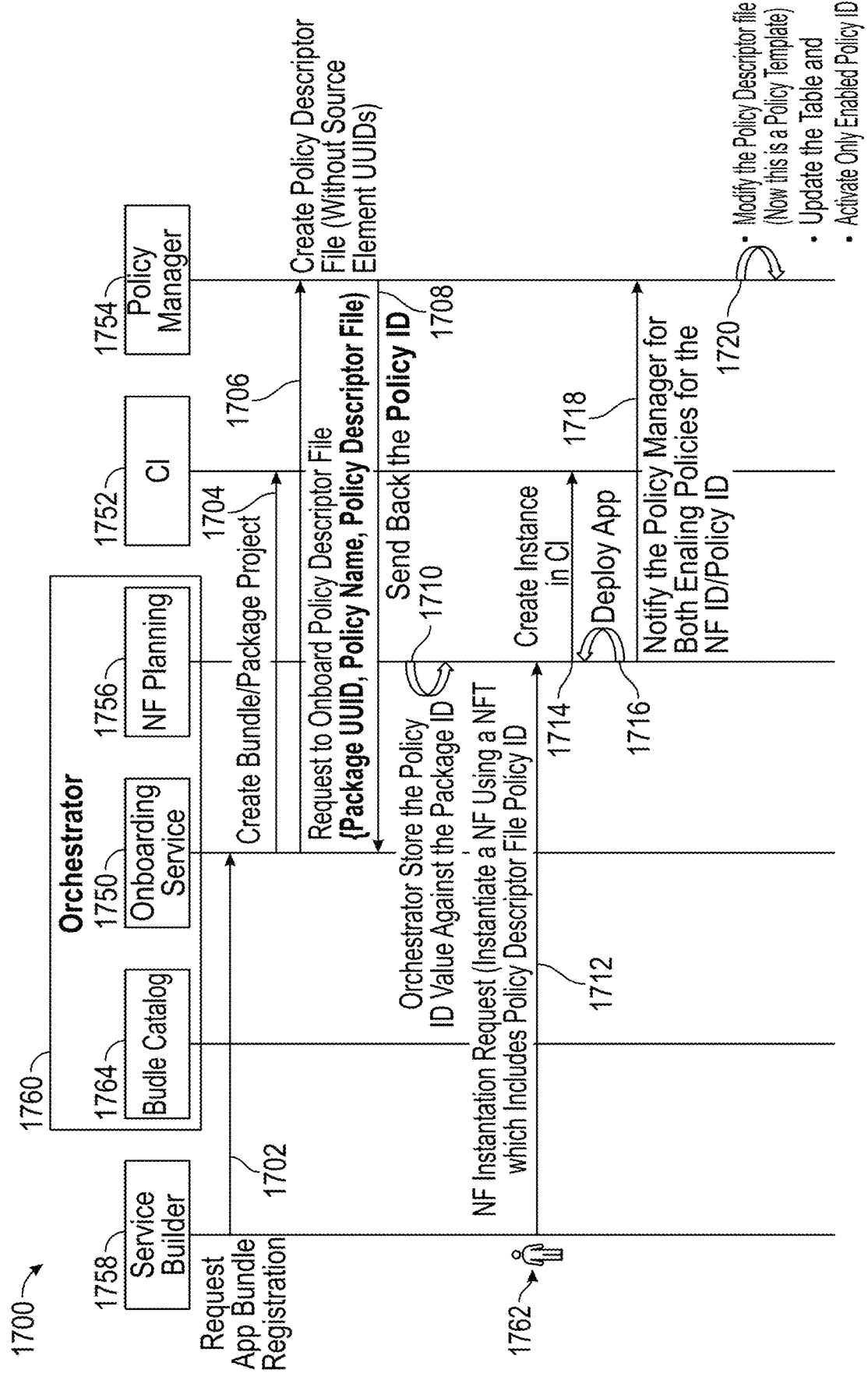
FIG. 17 is a data flow diagram of a method for policy onboarding unification, in accordance with some embodiments.

FIG. 17 is a data flow diagram of a method for policy onboarding unification 1700, in accordance with some embodiments.

In some embodiments, method for policy onboarding unification 1700 describes operations of unification of policy onboarding. While the operations of method for policy onboarding unification 1700 are discussed and shown as having a particular order, each operation in method for policy onboarding unification 1700 is configured to be performed in any order unless specifically called out otherwise. Method for policy onboarding unification 1700 is implemented as a set of operations, such as operations 1702 through 1720.

In some embodiments, method for policy onboarding unification 1700, such as a network function/network services (NF)/(NS) package onboarding, mitigates both security concerns as well as leveling out the learning curve for policy management users. In some embodiments, policy-definition unification allows the network day 2 assurance policies to be bundled together with the day 1 NF/NS package onboarding. In some embodiments, policy-definition unification allows unified onboarding automation which has several benefits, such as policy package scanning during bundle creation to report potential vulnerabilities and policy templates are validated as per the schema defined during policy bundle creation. In some embodiments, the policy bundle creation simplifies the day 2 policy-based assurance service creation.

At operation 1702 of method for policy onboarding unification 1700, service builder 1758 registers an application bundle, such as application bundles 1608 and 1610, at bundle catalog 1764 of orchestrator 1760. In response to submission of the NF application, service builder tool 1758 creates an application bundle and automatically registers the application bundle to bundle catalog 1764 of orchestrator 1760 via an application programming interface (API). A bundle is set of products that are offered under a single entitlement or license with no dedicated components. In bundle catalog 1764, a bundle is modeled as a software product with setup relationships to the software products.

In some embodiments, service builder tool 1758 is similar to service builder module 120 and includes references to network service bundles as the references are created by a slice manager. The slice manager is responsible for creating a network slice and NS subnet, whereas orchestrator 1760 is responsible for creating network services and network functions. Process flows from operation 1702 to operation 1704.

In some embodiments, method 1700 describes a method for network service bundle creation and transportation. The slice manager takes care of a network service bundle for further execution of the bundle services to northbound systems (handle specific goals of a systematic operation). In some embodiments, method 1700 describes a policy bundle which follows the same principle for bundle processing, with additional steps depicting how policy bundles are managed.

At operation 1704 of method for policy onboarding unification 1700, onboarding service 1750 of orchestrator 1760 creates bundle/package objects in the central inventory (CI) 1752 and stores the bundle/package objects as inventory files. In some embodiments, an object is a variable, a data structure, a function, or a method. As regions of memory, the application bundle objects contain value and are referenced by identifiers. In some embodiments, an application bundle object is a combination of variables, functions, and data structures. In some embodiments, an application bundle object is a table or column, or an association between data and a database entity. Process flows from operation 1704 to operation 1706.

At operation 1706 of method for policy onboarding unification 1700, onboarding service 1750 sends a request to policy manager 1754 for creating the policy descriptor files (e.g., policy name, policy descriptor file (e.g., policy descriptor files 1612 and 1614), bundle/package UUID, but without source element UUIDs). In some embodiments, application bundle descriptor file is a JSON file (e.g., policy.descriptor.json) that describes the application bundle. The descriptor file includes general information for the application bundle, as well as the modules that the application bundle wants to use or extend. The descriptor file serves as the glue between the remote application (e.g., with user 1762) and the application at a CN, such as CN 102. In some embodiments, when an administrator for a cloud instance installs an application, a descriptor file is installed, which contains pointers to a service. Process flows from operation 1706 to operation 1708.

At operation 1708 of method for policy onboarding unification 1700, policy manager 1754 returns the policy ID, corresponding to a rule-based policy and an application bundle, to orchestrator 1760. Process flows from operation 1708 to operation 1710.

At operation 1710 of method for policy onboarding unification 1700, life cycle management (LCM) or network function (NF) planning module 1756 stores the policy ID with the package ID. Application LCM is the product lifecycle management (e.g., governance, development, and maintenance) of computer programs. Life cycle encompasses requirements management, software architecture, computer programming, software testing, software maintenance, change management, continuous integration, project management, and release management. Process flows from operation 1710 to operation 1712.

At operation 1712 of method for policy onboarding unification 1700, a NF instantiation request (e.g., instantiate a NF using a NFT which includes policy descriptor file with Policy ID) from user 1762 is received. Process flows from operation 1712 to operation 1714.

At operation 1714 of method for policy onboarding unification 1700, a NF instance is created in CI 1752. In some embodiments, a user is instantiating/installing a network function for which the policy bundle has been created. The context of network function instantiation is included to relate that this network function is for policy creation. Process flows from operation 1714 to operation 1716.

At operation 1716 of method for policy onboarding unification 1700, orchestrator 1760 deploys the NF/application for user 1762. Process flows from operation 1716 to operation 1718.

At operation 1718 of method for policy onboarding unification 1700, orchestrator 1760 sends notification to policy manager 1754 to enable rule-based policies with respective policy IDs. Thus, as user 1762 is using the application, rule-based policies are in effect for the application. Process flows from operation 1718 to operation 1720.

At operation 1720 of method for policy onboarding unification 1700, policy manager 1754 modifies the policy files with pending (e.g., source element UUID and the like) information. After filling the pending information, the policy descriptor file becomes a policy template. A policy template table is updated and the enable policy ID is activated. In some embodiments, the template refers to a valid working policy file (i.e., a template is a name ecosystem terminology). A policy template is crated once a created policy has parameters to implement the policy.

Figure 18:
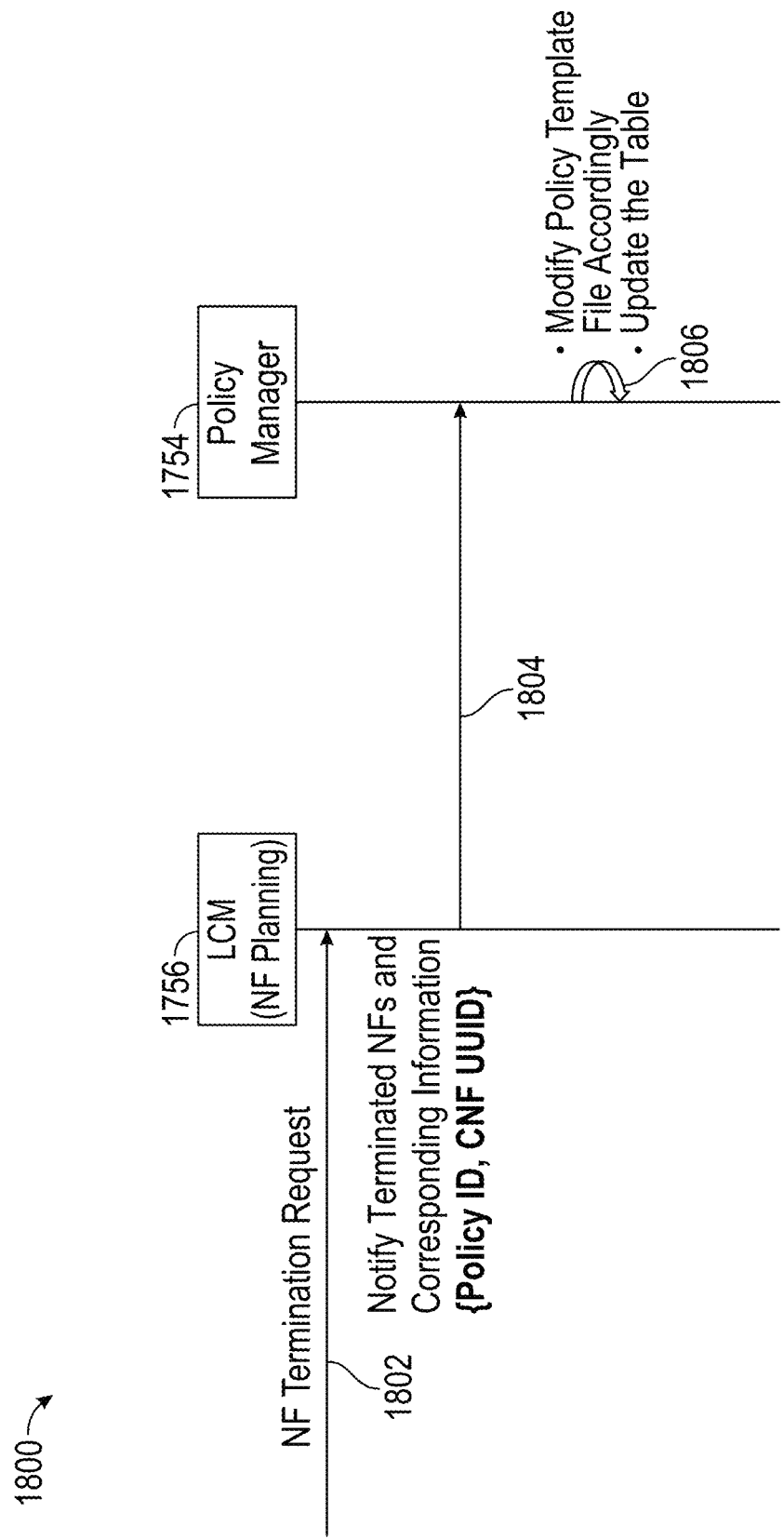
FIG. 18 is a data flow diagram of a method for application termination, in accordance with some embodiments.

FIG. 18 is a data flow diagram of a method for application termination 1800, in accordance with some embodiments.

In some embodiments, method for application termination 1800 describes operations of application termination. While the operations of method for application termination 1800 are discussed and shown as having a particular order, each operation in method for application termination 1800 is configured to be performed in any order unless specifically called out otherwise. Method for application termination 1800 is implemented as a set of operations, such as operations 1802 through 1806.

At operation 1802 of method for application termination 1800, a request for network function (NF) termination is received by orchestrator 1760 at LCM 1756. In a non-limiting example, a network function termination is a user, such as user 1762, who no longer is using a network function. In some embodiments, the request for NF termination comes from user 1762. Process flows from operation 1802 to operation 1804.

At operation 1804 of method for application termination 1800, LCM 1756 notifies policy manager 1754 of the terminated NF and any corresponding information regarding the terminated NF (e.g., policy ID, cloud native function (CNF) UUID). Process flows from operation 1804 to operation 1806.

At operation 1806 of method for application termination 1800, the policy template is modified accordingly (i.e., the policy is deactivated for the respective NF with is terminated). The template table is further updated to reflect the NF termination.

Figure 19:
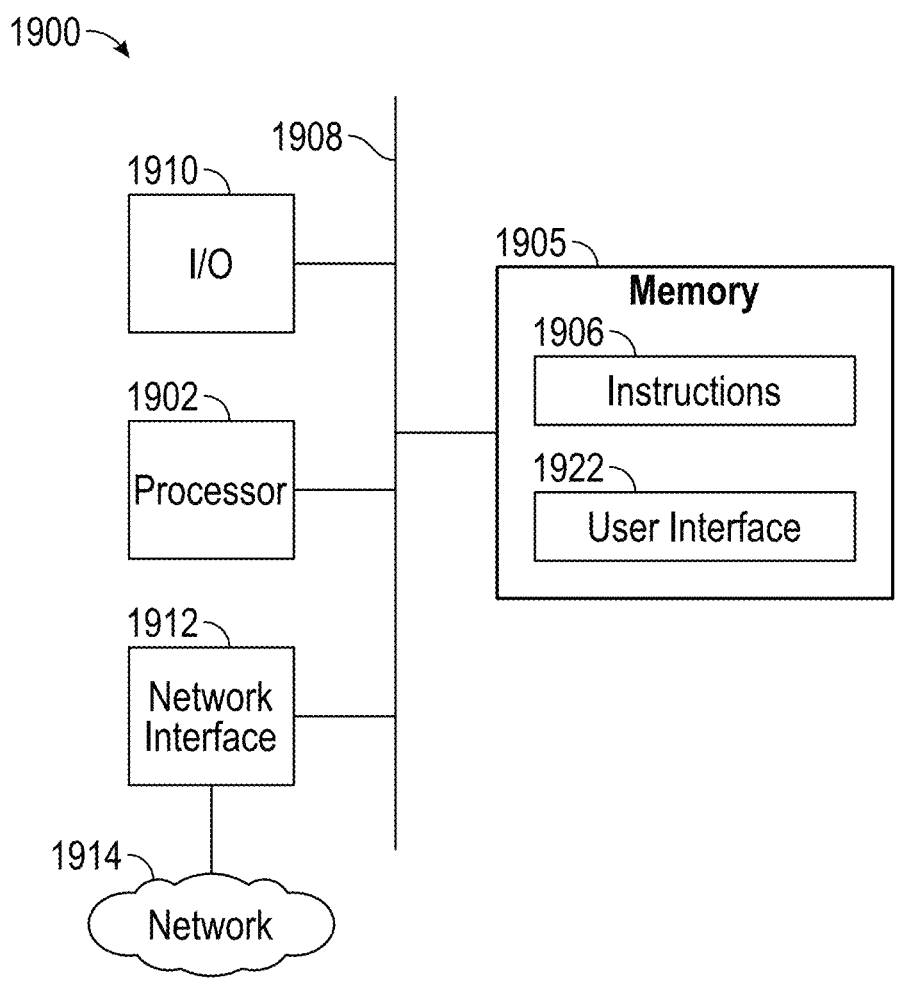
FIG. 19 is a high-level functional block diagram of a processor-based system, in accordance with some embodiments.

FIG. 19 is a block diagram of policy onboarding unification (POU) processing circuitry 1900 in accordance with some embodiments. In some embodiments, POU processing circuitry 1900 is a general-purpose computing device including a hardware processor 1902 and a non-transitory, computer-readable storage medium 1904. Storage medium 1904, amongst other things, is encoded with, i.e., stores, computer program code 1906, i.e., a set of executable instructions such as an algorithm, or methods 200, 1700, and 1800. Execution of instructions 1906 by hardware processor 1902 represents (at least in part) a policy onboarding unification application which implements a portion, or all the methods described herein in accordance with one or more embodiments (hereinafter, the noted processes and/or methods).

Processor 1902 is electrically coupled to a computer-readable storage medium 1904 via a bus 1908. Processor 1902 is further electrically coupled to an I/O interface 1910 by bus 1908. A network interface 1912 is further electrically connected to processor 1902 via bus 1908. Network interface 1912 is connected to a network 1914, so that processor 1902 and computer-readable storage medium 1904 connect to external elements via network 1914. Processor 1902 is configured to execute computer program code 1906 encoded in computer-readable storage medium 1904 to cause POU processing circuitry 1900 to be usable for performing a portion or all the noted processes and/or methods. In one or more embodiments, processor 1902 is a central processing unit (CPU), a multi-processor, a distributed processing system, an application specific integrated circuit (ASIC), and/or a suitable processing unit.

In one or more embodiments, computer-readable storage medium 1904 is an electronic, magnetic, optical, electromagnetic, infrared, and/or a semiconductor system (or apparatus or device). For example, computer-readable storage medium 1904 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 1904 includes a compact disk-read only memory (CD-ROM), a compact disk-read/write (CD-R/W), and/or a digital video disc (DVD).

In one or more embodiments, storage medium 1904 stores computer program code 1906 configured to cause POU processing circuitry 1900 to be usable for performing a portion or all the noted processes and/or methods. In one or more embodiments, storage medium 1904 further stores information, such as an algorithm which facilitates performing a portion or all the noted processes and/or methods.

POU processing circuitry 1900 includes I/O interface 1910. I/O interface 1910 is coupled to external circuitry. In one or more embodiments, I/O interface 1910 includes a keyboard, keypad, mouse, trackball, trackpad, touchscreen, and/or cursor direction keys for communicating information and commands to processor 1902.

POU processing circuitry 1900 further includes network interface 1912 coupled to processor 1902. Network interface 1912 allows POU processing circuitry 1900 to communicate with network 1914, to which one or more other computer systems are connected. Network interface 1912 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, is implemented in two or more POU processing circuitry 1900.

POU processing circuitry 1900 is configured to receive information through I/O interface 1910. The information received through I/O interface 1910 includes one or more of instructions, data, design rules, and/or other parameters for processing by processor 1902. The information is transferred to processor 1902 via bus 1908. POU processing circuitry 1900 is configured to receive information related to UI 1922 through I/O interface 1910. The information is stored in computer-readable medium 1904 as user interface (UI) 1922.

In some embodiments, a portion or all the noted processes and/or methods is implemented as a standalone software application for execution by a processor. In some embodiments, a portion or all the noted processes and/or methods is implemented as a software application that is a part of an additional software application. In some embodiments, a portion or all the noted processes and/or methods is implemented as a plug-in to a software application.

In some embodiments, a method for policy onboarding includes receiving, by a processor, a request from a network slice service builder module for registration of an application bundle; requesting, by the processor, a central inventory create an application bundle object; requesting, by the processor, a policy manager create a policy descriptor file corresponding to a rule-based policy and the application bundle; and receiving, by the processor, a policy identifier (ID) for the application bundle from the policy manager.

In some embodiments, the method for policy onboarding further includes receiving, by the processor, a request from a user to instantiate an application.

In some embodiments, the request from the user to instantiate the application includes a non-fungible token.

In some embodiments, the non-fungible token includes the policy descriptor file; and the policy ID.

In some embodiments, the method for policy onboarding further includes requesting, by the processor, the central inventory create an instance of the requested application to be instantiated.

In some embodiments, the method for policy onboarding further includes deploying, by the processor, the application on one or more user equipment.

In some embodiments, the method for policy onboarding further includes requesting, by the processor, the policy manager enable the rule-based policies based on the policy ID.

In some embodiments, the notifying the policy manager to enable the rule-based policies based on the policy ID includes modifying, by the policy manager, the policy descriptor file into a policy template file; updating, by the policy manager, a policy template table; and activating, by the policy manager, the rule-based policies based on the policy ID.

In some embodiments, the method for policy onboarding further includes receiving, by the processor, an application termination request.

In some embodiments, the method for policy onboarding further includes notifying, by the processor, the policy manager of the application termination request.

In some embodiments, the notifying the policy manager of the application termination request includes modifying a policy template file to reflect the application termination request; and update a policy template table.

In some embodiments, an apparatus includes a processor; and a memory having instructions stored thereon that, when executed by the processor, cause the processor to receive a request from a network slice service builder module for registration of an application bundle; request central inventory create an application bundle object; request a policy manager create a policy descriptor file corresponding to a rule-based policy and the application bundle; and receive a policy identifier (ID) for the application bundle from the policy manager.

In some embodiments, the instructions further cause the processor to receive a request from a user to instantiate an application.

In some embodiments, the request from the user to instantiate the application includes a non-fungible token.

In some embodiments, the non-fungible token includes the policy descriptor file; and the policy ID.

In some embodiments, the instructions further cause the processor to request the central inventory create an instance of the requested application to be instantiated.

In some embodiments, a non-transitory computer readable medium having instructions stored thereon that, when executed by a processor, cause the processor to receive a request from a network slice service builder module for registration of an application bundle; request central inventory create an application bundle object; request a policy manager create a policy descriptor file corresponding to a rule-based policy and the application bundle; and receive a policy identifier (ID) for the application bundle from the policy manager.

In some embodiments, the instructions further cause the processor to receive a request from a user to instantiate an application.

In some embodiments, the instructions further cause the processor to request the central inventory create an instance of the requested application to be instantiated.

In some embodiments, the instructions further cause the processor to deploy the application.

The foregoing outlines features of several embodiments so that those skilled in the art better understand the aspects of the present disclosure. Those skilled in the art should appreciate that they readily use the present disclosure as a basis for designing or modifying other processes and structures for conducting the same purposes and/or achieving the same advantages of the embodiments introduced herein. Those skilled in the art should further realize that such equivalent constructions do not depart from the spirit and scope of the present disclosure, and that they make various changes, substitutions, and alterations herein without departing from the spirit and scope of the present disclosure.

What is claimed is:

1. A method for policy onboarding, comprising:
   receiving, by a processor, a request from a network slice service builder module for registration of an application bundle;
   requesting, by the processor, a central inventory create an application bundle object;
   requesting, by the processor, a policy manager create a policy descriptor file corresponding to one or more rule-based policy and the application bundle; and
   receiving, by the processor, a policy identifier (ID) for the application bundle from the policy manager.

2. The method for policy onboarding of claim 1, further comprising:
   receiving, by the processor, from a user a request to instantiate an application.

3. The method for policy onboarding of claim 2, wherein the request from the user to instantiate the application includes a non-fungible token.

4. The method for policy onboarding of claim 3, wherein the non-fungible token includes:
   the policy descriptor file; and
   the policy ID.

5. The method for policy onboarding of claim 2, further comprising:
   requesting, by the processor, the central inventory create an instance of the requested application to be instantiated.

6. The method for policy onboarding of claim 5, further comprising:
   deploying, by the processor, the application on one or more user equipment.

7. The method for policy onboarding of claim 6, further comprising:
   requesting, by the processor, the policy manager enable the one or more rule-based policies based on the policy ID.

8. The method for policy onboarding of claim 7, wherein the requesting the policy manager to enable the one or more rule-based policies based on the policy ID comprises:
   modifying, by the policy manager, the policy descriptor file into a policy template file;
   updating, by the policy manager, a policy template table; and
   activating, by the policy manager, the one or more rule-based policies based on the policy ID.

9. The method for policy onboarding of claim 7, further comprising:
   receiving, by the processor, an application termination request.

10. The method for policy onboarding of claim 9, further comprising:
    notifying, by the processor, the policy manager of the application termination request.

11. The method for policy onboarding of claim 10, wherein the notifying the policy manager of the application termination request comprises:
    modifying a policy template file to reflect the application termination request; and
    update a policy template table.

12. An apparatus, comprising:
    a processor; and
    a memory having instructions stored thereon that, when executed by the processor, cause the processor to:
      receive a request from a network slice service builder module for registration of an application bundle;
      request central inventory create an application bundle object;
      request a policy manager create a policy descriptor file corresponding to one or more rule-based policy and the application bundle; and
      receive a policy identifier (ID) for the application bundle from the policy manager.

13. The apparatus of claim 12, wherein the instructions further cause the processor to:
    receive a request from a user to instantiate an application.

14. The apparatus of claim 13, wherein the request from the user to instantiate the application includes a non-fungible token.

15. The apparatus of claim 14, wherein the non-fungible token includes:
    the policy descriptor file; and
    the policy ID.

16. The apparatus of claim 13, wherein the instructions further cause the processor to:
    request the central inventory create an instance of the requested application to be instantiated.

17. A non-transitory computer readable medium having instructions stored thereon that, when executed by a processor, cause the processor to:
    receive a request from a network slice service builder module for registration of an application bundle;
    request a central inventory create an application bundle object;
    request a policy manager create a policy descriptor file corresponding to one or more rule-based policy and the application bundle; and
    receive a policy identifier (ID) for the application bundle from the policy manager.

18. The non-transitory computer readable medium of claim 17, wherein the instructions further cause the processor to:
    receive a request from a user to instantiate an application.

19. The non-transitory computer readable medium of claim 18, wherein the instructions further cause the processor to:
   request the central inventory create an instance of the requested application to be instantiated.

20. The non-transitory computer readable medium of claim 19, wherein the instructions further cause the processor to:
   deploy the application.

\* \* \* \* \*